US010119037B2

(12) United States Patent
Bisset et al.

(10) Patent No.: US 10,119,037 B2
(45) Date of Patent: Nov. 6, 2018

(54) CELLULOSE ACETATE WOOD FILLER COMPOSITIONS

(71) Applicant: CELANESE INTERNATIONAL CORPORATION, Irving, TX (US)

(72) Inventors: Wendy Bisset, Mountain View, CA (US); Xiaowei Zhang, Union, KY (US); Michael Combs, Pembroke, VA (US)

(73) Assignee: ACETATE INTERNATIONAL LLP, Irving, TX (US)

( * ) Notice: Subject to any disclaimer, the term of this patent is extended or adjusted under 35 U.S.C. 154(b) by 0 days.

(21) Appl. No.: 15/370,548

(22) Filed: Dec. 6, 2016

(65) Prior Publication Data

US 2017/0158881 A1 Jun. 8, 2017

Related U.S. Application Data

(60) Provisional application No. 62/264,273, filed on Dec. 7, 2015, provisional application No. 62/333,554, filed on May 9, 2016.

(51) Int. Cl.

| C09D 5/34 | (2006.01) |
|---|---|
| C08K 5/00 | (2006.01) |
| C08K 5/11 | (2006.01) |
| C08K 5/1535 | (2006.01) |
| C08K 5/1565 | (2006.01) |
| C08K 5/21 | (2006.01) |
| C08K 5/3415 | (2006.01) |
| C08K 5/544 | (2006.01) |
| C09J 101/02 | (2006.01) |

(52) U.S. Cl.
CPC .............. *C09D 5/34* (2013.01); *C08K 5/0016* (2013.01); *C08K 5/11* (2013.01); *C08K 5/1535* (2013.01); *C08K 5/1565* (2013.01); *C08K 5/21* (2013.01); *C08K 5/3415* (2013.01); *C08K 5/544* (2013.01); *C09J 101/02* (2013.01)

(58) Field of Classification Search
CPC .................................................... C09J 101/00
See application file for complete search history.

(56) References Cited

U.S. PATENT DOCUMENTS

| 1,947,438 A | 2/1934 | Walsh |
| 1,958,707 A | 5/1934 | Kocher et al. |
| 2,092,229 A | 9/1937 | Thinius et al. |
| 2,461,900 A | 2/1949 | Johnson et al. |
| 2,740,776 A | 4/1956 | Rosen et al. |
| 5,338,785 A | 8/1994 | Catena et al. |
| 5,610,233 A | 3/1997 | Sharma |
| 5,688,494 A | 11/1997 | Graves et al. |
| 5,977,217 A | 11/1999 | Socci et al. |
| 6,036,761 A * | 3/2000 | Columbus ................ C09D 5/34 106/162.5 |
| 6,551,392 B1 | 4/2003 | Otaki et al. |
| 6,811,599 B2 * | 11/2004 | Fischer .................. C08K 3/346 106/157.71 |
| 7,094,817 B2 * | 8/2006 | Halley ...................... C08L 3/00 524/386 |
| 8,586,656 B2 | 11/2013 | Shiotani et al. |
| 2003/0012750 A1 | 1/2003 | Socci et al. |
| 2007/0231281 A1 | 10/2007 | Socci et al. |
| 2007/0280978 A1 | 12/2007 | Takada et al. |
| 2013/0096297 A1 | 4/2013 | Combs et al. |
| 2014/0087122 A1 | 3/2014 | Combs et al. |
| 2014/0193653 A1 * | 7/2014 | Combs ...................... C09J 5/00 428/535 |

FOREIGN PATENT DOCUMENTS

| CA | 483722 | * | 6/1952 |
| CA | 483722 A | | 6/1952 |
| SU | 1284966 A1 | | 1/1987 |
| WO | 2014046680 A1 | | 3/2014 |

OTHER PUBLICATIONS

International Search Report received in the related International Patent Application No. PCT/US2016/065073, dated Jun. 20, 2017.
International Search Report received in the corresponding International Patent Application No. PCT/US2016/065066, dated Jun. 21, 2017.
U.S. Appl. No. 15/370,580, filed Dec. 6, 2016, Bisset, et al.
May 29, 2018 Office Action received in the related U.S. Appl. No. 15/370,580.

\* cited by examiner

*Primary Examiner* — Melvin C. Mayes
*Assistant Examiner* — Colette B Nguyen
(74) *Attorney, Agent, or Firm* — Kilpatrick Townsend & Stockton LLP

(57) ABSTRACT

A cellulose acetate wood filler composition comprises a binder composition and a filler. The binder compositions comprise cellulose acetate, a plasticizer, and at least one organic solvent. The binder compositions may be substantially free, e.g., free of tackifiers. The wood filler compositions may be used in a method of filling a cavity in a substrate. The method comprises applying the wood filler composition to an inner surface of the substrate.

20 Claims, No Drawings

CELLULOSE ACETATE WOOD FILLER COMPOSITIONS

CROSS-REFERENCE TO RELATED APPLICATIONS

This application is a non-provisional of U.S. Provisional Application No. 62/264,273, filed Dec. 7, 2015 and U.S. Provisional Application No. 62/333,554, filed May 9, 2016, the entireties of which are incorporated herein by reference.

FIELD OF THE INVENTION

The present invention relates generally to wood filler compositions containing cellulose acetate. In particular, the present invention relates to wood filler compositions comprising a binder composition and a filler. The binder compositions comprise cellulose acetate, a plasticizer, and at least one organic solvent.

BACKGROUND OF THE INVENTION

The need exists for wood filler compositions that are capable of adhering to a variety of substrate types, including treated wood and untreated wood. Wood fillers are used in the construction and furniture industries to repair soft or hard wood or wood products, and also by contractors and do-it-yourself consumers to repair or cure imperfections in furniture or woodwork, often where the wood has been cracked or otherwise been damaged. It is desirable that wood be able to maintain its natural beauty, such as when wood is stained to show the grain. It must not be readily apparent that a filler has been applied to the wood. It is therefore important that the filler be able to be smoothed even with the wood surface. It is also desirable that the wood filler remain adhered to the wood, whether the wood is natural, painted, or stained.

There are several beneficial characteristics to be achieved in a wood filler product. The wood filler should be easily spreadable, and should spread without the filler breaking up as it is spread. A wood filler also most advantageously has a sufficiently long working time to allow the wood filler to be worked into a desired form or surface before setting. It is also desirable to produce a wood filler that also has a relatively short setting time, so that the wood filler sets to a point where it can be sanded or otherwise finished in a relatively short period of time. In this regard, it is also beneficial to produce a wood filler that may be sanded without clogging the sand paper or other abrading media (that may reduce its efficacy). It is also beneficial to produce a wood filler that does not shrink or crack upon drying. Another beneficial characteristic in a wood filler is to have a relatively low post-drying density which bears a relation to the ability of the filler resist cracking or shrinking upon drying. It is also desirable that the wood filler have uniform staining characteristics, to resist over-staining or under-staining.

Various wood fillers are available in the art, and generally utilize waterborne technology or solvent-borne technology. Although solvent-borne technologies form a surface skin more rapidly than waterborne technologies, the interior part of the product still is heavily filled with either a flammable solvent or water which prevents or restricts the product from complete internal setting/solidification. Upon drying, conventional wood fillers are also subject to volume shrinkage due to the solvent or water that evaporates as the product sets. This effect may reduce the total strength of a repaired area. Hot melt adhesive technology provides rapid "through cure" as the product cools from a molten state to a fixed, room temperature state; however, such materials lack important wood filler properties such as ease of sandability and stainability. Therefore, there is an ongoing need for an effective wood product that does not suffer from these deficiencies.

The use of cellulose-containing compounds in wood fillers is known in the art. As described in U.S. Pat. No. 1,947,438, a cellulose ester, specifically nitrocellulose, was used in a wood filler composition. Wood filler compositions containing a cellulose ester that are known in the art rely on rosin esters, resins, or gums as tackifiers. The composition containing cellulose acetate described in U.S. Pat. No. 1,947,438 includes 100 parts cellulose acetate, 5 parts triphenyl phosphate, 15 parts paraethyltoluenesulphonamide, 5 parts dibutyl tartrate, 35 parts dimethyl phthalate, 35 parts ester gum, 250 parts wood flour, and 600 parts volatile solvent. However, these wood filler compositions suffer from low adhesion on certain substrates.

U.S. Pat. No. 6,036,761 also a solvent based wood filler comprising an organic solvent component, nitrocellulose, calcium carbonate, a filler selected from aluminum silicate and magnesium silicate and mixtures thereof, and wood flour.

Although cellulose nitrate, also referred to as nitrocellulose, dries quickly and has other benefits, it also has a significant limitation because it is a highly flammable compound. Because of this flammability (and explosiveness), there is a commercial need for wood filler products with comparable performance but which do not use cellulose nitrate. Although cellulose acetate butyrate and cellulose acetate propionate are possible replacements, their costs make them less desirable for wood fillers. Accordingly, the needs exists for cost-effective wood filler compositions that are capable of adhering to a variety of substrate types, including treated and untreated wood, but that do not have the flammability concern of prior wood filler compositions.

SUMMARY OF THE INVENTION

In one embodiment, the invention relates to a binder composition, comprising: from 5 to 20 wt. % cellulose acetate; from 3 to 20 wt. % plasticizer; and from 60 to 92 wt. % of at least one organic solvent, wherein the binder composition is substantially free from tackifiers. The binder composition may comprise at least two organic solvents. The cellulose acetate may be present in an amount of from 7 to 20 wt. % or from 11 to 15 wt. %, based on the total weight of the binder composition. The plasticizer may be selected from the group consisting of propylene carbonate, g-valerolactone, acetyl triethylcitrate, N-methylpyrrolidinone, glycerin carbonate, 2-methoxyethanol, 1,2-dimethoxyethane, triacetin, glycerol tribenzoate, diethylphthalate, sucrose benzoate, diethylene glycol benzoate, dipropylene glycol benzoate, sulfonamides, n-ethyl toluene sulfonamide, sucrose acetate isobutyrate, and combinations thereof. The plasticizer may be present in an amount of from 3% to 15 wt. % based on the total weight of the binder composition. The at least one organic solvent may be selected from the group consisting of acetone, n-butyl acetate, ethyl acetate, isopropanol, methyl ethyl ketone, cyclohexanone, ethanol, ethyl lactate, dimethyl carbonate, diacetone alcohol, and combinations thereof. The binder composition may further comprise an additive. The additive may be an adhesion promoter. The additive may be an amine-containing compound, an imine-containing compound, or an amide-containing compound. In some aspects, the additive is selected from the group consisting of phenylurea, urea, 3-aminopropyltriethoxysilane, polyethyleneimine, imidazoles, pyridines, aryl sulfonamides, heterocyclic aromatic amines, imines and amides, and combinations thereof. In some aspects, the additive may include 1-methyl imidazole, n-methylpyrrolidinone, and/or caprolactam. The binder composition may be substantially free from rosins and rosin derivatives.

In another embodiment, the invention relates to a wood filler composition, comprising: a binder composition comprising from 5 to 20 wt. % cellulose acetate; from 3 to 20 wt. % plasticizer; and from 60 to 92 wt. % of at least one organic solvent; and a filler in an amount of from 35 to 65 wt. % based on the total weight of the wood filler composition; wherein the wood filler composition is substantially free from tackifiers. The filler may be an organic filler, such as cellulose. In some aspects, the filler may be selected from the group consisting of wood flour, magnesium sulfate, calcium sulfate, calcium carbonate, microspheres, cotton flock, ground peat, cork, magnesium silicate, aluminum silicate, montmorillonite clay, starch, and combinations thereof. The filler may be present in an amount of from 35% to 60% or from 40 to 55% based on the total weight of the wood filler composition. The cellulose acetate may be present in an amount from 5 to 10 wt. % or from 5.5 to 7.5 wt. %, based on the total weight of the wood filler composition. The plasticizer may be selected from the group consisting of propylene carbonate, g-valerolactone, acetyl triethylcitrate, n-methylpyrrolidinone, glycerin carbonate, 2-methoxyethanol, 1,2-dimethoxyethane, triacetin, glycerol tribenzoate, diethylphthalate, sucrose benzoate, diethylene glycol benzoate, dipropylene glycol benzoate, sulfonamides, n-ethyl toluene sulfonamide, sucrose acetate isobutyrate, and combinations thereof. The plasticizer may be present in an amount of from 2% to 7.5 wt. % based on the total weight of the binder composition. The at least one organic solvent may be selected from the group consisting of acetone, n-butyl acetate, ethyl acetate, isopropanol, methyl ethyl ketone, cyclohexanone, ethanol, ethyl lactate, dimethyl carbonate, diacetone alcohol, and combinations thereof. The wood filler composition may further comprise an additive. The additive may be an adhesion promoter. The additive may be an amine-containing compound or an imine-containing compound. In some aspects, the additive is selected from the group consisting of phenylurea, urea, 3-aminopropyltriethoxysilane, polyethyleneimine, imidazoles, pyridines, aryl sulfonamides heterocyclic aromatic amines, imines and amides, and combinations thereof. The wood filler composition may be free from tackifiers. The wood filler composition may be free from rosins and rosin derivatives.

In yet another embodiment, the present invention is directed to a method of filling a cavity in a substrate, comprising: applying a wood filler composition to an inner surface of the substrate, wherein the wood filler composition comprises a filler in an amount of from 35 to 65 wt. % based on the total weight of the wood filler composition and a binder composition comprising from 5 to 20 wt. % cellulose acetate; from 3 to 20 wt. % plasticizer; and from 60 to 92 wt. % of at least one organic solvent, wherein the wood filler composition is substantially free from tackifiers. The substrate may be wood, and the wood may be bare (natural), painted, or stained.

In a further embodiment, the present invention is directed to a wood filler composition, comprising: a binder composition comprising from 5 to 20 wt. % cellulose acetate; from 3 to 20 wt. % plasticizer; and from 60 to 92 wt. % of at least one organic solvent; and a filler in an amount of from 35 to 65 wt. % based on the total weight of the wood filler composition; wherein the filler comprises microspheres and further wherein the wood filler composition is substantially free from tackifiers.

In another embodiment, the present invention is directed to a method for improving stainability of a wood filler composition, comprising: a) applying a wood filler composition to a substrate and b) staining the substrate; wherein the wood filler composition comprises a binder composition comprising from 5 to 20 wt. % cellulose acetate; from 3 to 20 wt. % plasticizer; and from 60 to 92 wt. % of at least one organic solvent; and a filler in an amount of from 35 to 65 wt. % based on the total weight of the wood filler composition; wherein the filler comprises microspheres and further wherein the wood filler composition is substantially free from tackifiers.

DETAILED DESCRIPTION OF THE INVENTION

I. Introduction

The present invention is directed to providing binder compositions that use cellulose acetate in place of cellulose nitrate, and to wood filler compositions that contain the binder compositions. Cellulose acetate is an attractive substitute for cellulose nitrate because it is not nearly as flammable as cellulose nitrate, does not yellow over time, is less expensive than other known alternatives, including cellulose acetate butyrate and cellulose acetate propionate, and has a faster dry time in final formulations, such as wood fillers, than a comparable cellulose nitrate formulation. One problem associated with cellulose acetate is the incompatibility of cellulose acetate with numerous components of known binder and wood filler compositions. For example, cellulose acetate is incompatible with numerous solvents, plasticizers, resins and rosins often used as tackifiers. Additional difficulties with cellulose acetate include high viscosity and lack of adhesion to some types of wood, e.g., stained and/or painted wood.

To address these problems, the present invention is directed to specific binder compositions which use a plasticizer and at least one organic solvent that are compatible with cellulose acetate. Further additives may also be included to control viscosity and adhesion. Accordingly, the present invention is directed to novel binder compositions that comprise cellulose acetate, a plasticizer, and a solvent. The binder composition may comprise from 5 to 20 wt. % cellulose acetate, from 3 to 20 wt. % plasticizer, and from 60 to 92 wt. % of at least one organic solvent, based on the total weight of the binder composition. The binder composition is substantially free from tackifiers, e.g., comprises less than 0.01 wt. % tackifiers, or free from tackifiers, as described herein.

The present invention is also directed to a wood filler composition comprising a binder composition and filler. The binder composition, as described above, may comprise from 5 to 20 wt. % cellulose acetate, from 3 to 20 wt. % plasticizer, and from 60 to 92 wt. % of at least one organic solvent, based on the total weight of the binder composition. The binder composition is substantially free from tackifiers. The wood filler composition may comprise from 35 to 65 wt. % binder composition and from 35 to 65 wt. % filler, based on the total weight of the wood filler composition.

II. Binder Composition

The binder composition of the present invention comprises cellulose acetate, a plasticizer, and at least one organic solvent. As explained herein, the specific components, their weight percentages, and their ratios to each other have resulted in binder compositions that when incorporated into a wood filler composition, have comparable performance to the cellulose nitrate wood filler compositions that they are intended to replace. The binder composition generally has a solids content of at least 10%, e.g., at least 15% and a viscosity of at least 2000 cPs, e.g., at least 3000 cPs or at least 4000 cPs. In terms of ranges, the solids content may range from 10 to 40%, e.g., from 10 to 30%, from 10 to 25%, or from 15 to 20%. In terms of ranges, the viscosity may range from 2000 to 7000 cPs, e.g., from 3000 to 7000 cPs or from 4000 to 6000 cPs.

Cellulose Acetate

The cellulose acetate used in the binder composition and in the wood filler composition may be prepared by known processes, including those disclosed in U.S. Pat. No. 2,740,775 and in U.S. Publication No. 2013/0096297, the entireties of which are incorporated by reference herein. Typically, acetylated cellulose is prepared by reacting cellulose with an acetylating agent in the presence of a suitable acidic catalyst.

The cellulose may be from a soft wood or from a hardwood. Softwood is a generic term typically used in reference to wood from conifers (i.e., needle-bearing trees from the order Pinales). Softwood-producing trees include pine, spruce, cedar, fir, larch, douglas-fir, hemlock, cypress, redwood and yew. Conversely, the term hardwood is typically used in reference to wood from broad-leaved or angiosperm trees. The terms "softwood" and "hardwood" do not necessarily describe the actual hardness of the wood. While, on average, hardwood is of higher density and hardness than softwood, there is considerable variation in actual wood hardness in both groups, and some softwood trees can actually produce wood that is harder than wood from hardwood trees. One feature separating hardwoods from softwoods is the presence of pores, or vessels, in hardwood trees, which are absent in softwood trees. On a microscopic level, softwood contains two types of cells, longitudinal wood fibers (or tracheids) and transverse ray cells. In softwood, water transport within the tree is via the tracheids rather than the pores of hardwoods. In some aspects, a hardwood cellulose is preferred for acetylating.

Acylating agents can include both carboxylic acid anhydrides (or simply anhydrides) and carboxylic acid halides, particularly carboxylic acid chlorides (or simply acid chlorides). Suitable acid chlorides can include, for example, acetyl chloride, propionyl chloride, butyryl chloride, benzoyl chloride and like acid chlorides. Suitable anhydrides can include, for example, acetic anhydride, propionic anhydride, butyric anhydride, benzoic anhydride and like anhydrides. Mixtures of these anhydrides or other acylating agents can also be used in order to introduce differing acyl groups to the cellulose. Mixed anhydrides such as, for example, acetic propionic anhydride, acetic butyric anhydride and the like can also be used for this purpose in some embodiments.

In most cases, the cellulose is exhaustively acetylated with the acetylating agent to produce a derivatized cellulose having a high DS value, such as from 2.5 to 3, e.g., about 3, along with some additional hydroxyl group substitution (e.g., sulfate esters) in some cases. Exhaustively acetylating the cellulose refers to an acetylation reaction that is driven toward completion such that as many hydroxyl groups as possible in cellulose undergo an acetylation reaction.

Suitable acidic catalysts for promoting the acetylation of cellulose often contain sulfuric acid or a mixture of sulfuric acid and at least one other acid. Other acidic catalysts not containing sulfuric acid can similarly be used to promote the acetylation reaction. In the case of sulfuric acid, at least some of the hydroxyl groups in the cellulose can become initially functionalized as sulfate esters during the acetylation reaction. Once exhaustively acetylated, the cellulose is then subjected to a controlled partial de-esterification step, generally in the presence of a de-esterification agent, also referred to as a controlled partial hydrolysis step.

De-esterification, as used herein, refers a chemical reaction during which one or more of the ester groups of the intermediate cellulosic ester are cleaved from the cellulose acetate and replaced with a hydroxyl group, resulting in a cellulose acetate product having a (second) DS of less than 3. "De-esterifying agent," as used herein, refers to a chemical agent capable of reacting with one or more of the ester groups of the cellulose acetate to form hydroxyl groups on the intermediate cellulosic ester. Suitable de-esterifying agents include low molecular weight alcohols, such as methanol, ethanol, isopropyl alcohol, pentanol, R—OH, wherein R is $C_1$ to $C_{20}$ alkyl group, and mixtures thereof. Water and a mixture of water and methanol may also be used as the de-esterifying agent. Typically, most of these sulfate esters are cleaved during the controlled partial hydrolysis used to reduce the amount of acetyl substitution. The reduced degree of substitution may range from 0.5 to 2.9, e.g., from 1.5 to 2.9 or from 2.2 to 2.7. The degree of substitution may be selected based on the at least one organic solvent to be used in the binder composition. For example, when acetone is used as an organic solvent, the degree of substitution may range from 2.2 to 2.65.

The number average molecular weight of the cellulose acetate may range from 30,000 amu to 100,000 amu, e.g., from 50,000 amu to 80,000 amu and may have a polydispersity from 1.5 to 2.5, e.g., from 1.75 to 2.25 or from 1.8 to 2.2. All molecular weight recited herein, unless otherwise specified, are number average molecular weights. The molecular weight may be selected based on the desired hardness of the final wood filler composition. Although greater molecular weight leads to increased hardness, greater molecular weight also increases viscosity. The cellulose acetate may be provided in powder or flake form.

In some aspects, blends of different molecular weight cellulose acetate flake or powder may be used. As described herein, cellulose acetate having greater molecular weight has greater hardness but also greater viscosity that may make the binder composition more difficult to use. Accordingly, a blend of high molecular weight cellulose acetate, e.g., a cellulose acetate having a molecular weight above 60,000 amu, may be blended with a low molecular weight cellulose acetate, e.g., a cellulose acetate having a molecular weight below 60,000 amu. The ratio of high molecular weight cellulose acetate to low molecular weight cellulose acetate may vary depending at least on the desired hardness and viscosity but may generally range from 1:10 to 10:1; e.g., from 1:5 to 5:1 or from 1:3 to 3:1.

The cellulose acetate may be present in the binder composition in an amount from 5 to 20 wt. % based on the total weight of the binder composition. For example, the cellulose ester may be present in an amount from 7 wt. % to 20 wt. %, e.g., from 11 wt. % to 15 wt. %, or from 9 wt. % to 14 wt. %. In some aspects, depending on the molecular weight of the cellulose acetate, the cellulose acetate may be present in the binder composition in an amount from 5 to 40 wt. % based on the total weight of the binder composition. For example, the cellulose ester may be present in an amount from 7 wt. % to 40 wt. %, e.g., from 11 wt. % to 35 wt. %, or from 9 wt. % to 35 wt. %. In embodiments with greater amounts of cellulose ester (e.g., from 20 to 40 wt. %), the percentages of organic solvent and plasticizer may be adjusted accordingly in the binder composition.

Plasticizers

The plasticizer may comprise a cellulose plasticizer generally known to one skilled in the art, including but not limited to at least one plasticizer selected from the group consisting of: Formula 1 wherein R1 is H, $C_1$-$C_4$ alkyl, aryl, or $C_1$-$C_4$ alkyl aryl; Formula 2 wherein R2 is H, $C_1$-$C_4$ alkyl, aryl, or $C_1$-$C_4$ alkyl aryl and R3 is H, $C_1$-$C_4$ alkyl, aryl, $C_1$-$C_4$ alkyl aryl, acyl, or $C_1$-$C_4$ alkyl acyl; Formula 3 wherein R4 and R6 are independently H, $C_1$-$C_4$ alkyl, aryl, $C_1$-$C_4$ alkyl aryl, COOH, $C_1$-$C_4$ alkyl carboxylate, acyl, $C_1$-$C_4$ alkyl acyl, amine, $C_1$-$C_4$ alkyl amine, amide, or $C_1$-$C_4$ alkyl amide and R5 is H, $C_1$-$C_4$ alkyl, aryl, $C_1$-$C_4$ alkyl aryl, acyl, or $C_1$-$C_4$ alkyl acyl; Formula 4 wherein R7 is H, $C_1$-$C_4$ alkyl, aryl, $C_1$-$C_4$ alkyl aryl, OH, $C_1$-$C_4$ alkoxy, amine, or $C_1$-$C_4$ alkyl amine and R8 and R9 are independently H, $C_1$-$C_4$ alkyl, aryl, $C_1$-$C_4$ alkyl aryl, COOH, $C_1$-$C_4$ alkyl carboxylate, acyl, $C_1$-$C_4$ alkyl acyl, amine, $C_1$-$C_4$ alkyl amine, amide, or $C_1$-$C_4$ alkyl amide; Formula 5 wherein R10, R11, and R12 are independently H, $C_1$-$C_4$ alkyl, aryl, $C_1$-$C_4$ alkyl aryl, COOH, $C_1$-$C_4$ alkyl carboxylate, acyl, $C_1$-$C_4$ alkyl acyl, amine, $C_1$-$C_4$ alkyl amine, amide, or $C_1$-$C_4$ alkyl amide; Formula 6 wherein R13 is H, $C_1$-$C_4$ alkyl, aryl, or $C_1$-$C_4$ alkyl aryl, R14 and R16 are independently H, $C_1$-$C_4$ alkyl, aryl, $C_1$-$C_4$ alkyl aryl, COOH, $C_1$-$C_4$ alkyl carboxylate, acyl, $C_1$-$C_4$ alkyl acyl, amine, $C_1$-$C_4$ alkyl amine, amide, or $C_1$-$C_4$ alkyl amide, and R15 is H, $C_1$-$C_4$ alkyl, aryl, $C_1$-$C_4$ alkyl aryl, acyl, or $C_1$-$C_4$ alkyl acyl; Formula 7 wherein R17 is H or $C_1$-$C_4$ alkyl and R18, R19, and R20 are independently H, $C_1$-$C_4$ alkyl, aryl, $C_1$-$C_4$ alkyl aryl, COOH, $C_1$-$C_4$ alkyl carboxylate, acyl, $C_1$-$C_4$ alkyl acyl, amine, $C_1$-$C_4$ alkyl amine, amide, or $C_1$-$C_4$ alkyl amide; Formula 8 wherein R21 is H, $C_1$-$C_4$ alkyl, aryl, $C_1$-$C_4$ alkyl aryl, COOH, $C_1$-$C_4$ alkyl carboxylate, acyl, $C_1$-$C_4$ alkyl acyl, amine, $C_1$-$C_4$ alkyl amine, amide, or $C_1$-$C_4$ alkyl amide and R22 is H, $C_1$-$C_4$ alkyl, aryl, $C_1$-$C_4$ alkyl aryl, acyl, $C_1$-$C_4$ alkyl acyl, amine, or $C_1$-$C_4$ alkyl amine; Formula 9 wherein R23 and R24 are independently H, $C_1$-$C_4$ alkyl, aryl, $C_1$-$C_4$ alkyl aryl, COOH, $C_1$-$C_4$ alkyl carboxylate, acyl, $C_1$-$C_4$ alkyl acyl, amine, $C_1$-$C_4$ alkyl amine, amide, or $C_1$-$C_4$ alkyl amide; Formula 10 wherein R25, R26, R27, and R28 are independently H, $C_1$-$C_4$ alkyl, aryl, $C_1$-$C_4$ alkyl aryl, COOH, $C_1$-$C_4$ alkyl carboxylate, acyl, $C_1$-$C_4$ alkyl acyl, amine, $C_1$-$C_4$ alkyl amine, amide, or $C_1$-$C_4$ alkyl amide; Formula 11 wherein R29, R30, and R31 are independently H, $C_1$-$C_4$ alkyl, aryl, $C_1$-$C_4$ alkyl aryl, COOH, $C_1$-$C_4$ alkyl carboxylate, acyl, $C_1$-$C_4$ alkyl acyl, amine, $C_1$-$C_4$ alkyl amine, amide, or $C_1$-$C_4$ alkyl amide; Formula 12 wherein R32 is H, $C_1$-$C_4$ alkyl, aryl, $C_1$-$C_4$ alkyl aryl, R33 is H, $C_1$-$C_4$ alkyl, aryl, $C_1$-$C_4$ alkyl aryl, OH, $C_1$-$C_4$ alkoxy, acyl, $C_1$-$C_4$ alkyl acyl, amine, or $C_1$-$C_4$ alkyl amine, and R34, R35, and R36 are independently H, $C_1$-$C_4$ alkyl, aryl, $C_1$-$C_4$ alkyl aryl, COOH, $C_1$-$C_4$ alkyl carboxylate, acyl, $C_1$-$C_4$ alkyl acyl, amine, $C_1$-$C_4$ alkyl amine, amide, or $C_1$-$C_4$ alkyl amide; Formula 13 wherein R37, R38, R39, and R40 are independently H, $C_1$-$C_4$ alkyl, aryl, $C_1$-$C_4$ alkyl aryl, COOH, $C_1$-$C_4$ alkyl carboxylate, acyl, $C_1$-$C_4$ alkyl acyl, amine, $C_1$-$C_4$ alkyl amine, amide, or $C_1$-$C_4$ alkyl amide; Formula 14 wherein R41 is H, $C_1$-$C_4$ alkyl, aryl, $C_1$-$C_4$ alkyl aryl, OH, or $C_1$-$C_4$ alkoxy and R42 and R43 are independently H, $C_1$-$C_4$ alkyl, aryl, $C_1$-$C_4$ alkyl aryl, COOH, $C_1$-$C_4$ alkyl carboxylate, acyl, $C_1$-$C_4$ alkyl acyl, amine, $C_1$-$C_4$ alkyl amine, amide, or $C_1$-$C_4$ alkyl amide; triazine (1,2,3, 1,2,4, or 1,3,5) with R substituents from each of the cyclic carbons or cyclic nitrogens that are independently H, $C_1$-$C_4$ alkyl, aryl, $C_1$-$C_4$ alkyl aryl, COOH, $C_1$-$C_4$ alkyl carboxylate, acyl, $C_1$-$C_4$ alkyl acyl, amine, $C_1$-$C_4$ alkyl amine, amide, or $C_1$-$C_4$ alkyl amide; triazole (1,2,3 or 1,2,4) with R substituents from each of the cyclic carbons or cyclic nitrogens that are independently H, $C_1$-$C_4$ alkyl, aryl, $C_1$-$C_4$ alkyl aryl, COOH, $C_1$-$C_4$ alkyl carboxylate, acyl, $C_1$-$C_4$ alkyl acyl, amine, $C_1$-$C_4$ alkyl amine, amide, or $C_1$-$C_4$ alkyl amide; pyrrole with R substituents from each of the cyclic carbons or cyclic nitrogens that are independently H, $C_1$-$C_4$ alkyl, aryl, $C_1$-$C_4$ alkyl aryl, OH, $C_1$-$C_4$ alkoxy, COOH, $C_1$-$C_4$ alkyl carboxylate, acyl, $C_1$-$C_4$ alkyl acyl, amine, $C_1$-$C_4$ alkyl amine, amide, or $C_1$-$C_4$ alkyl amide; piperidine with R substituents from each of the cyclic carbons or cyclic nitrogens that are independently H, $C_1$-$C_4$ alkyl, aryl, $C_1$-$C_4$ alkyl aryl, OH, $C_1$-$C_4$ alkoxy, COOH, $C_1$-$C_4$ alkyl carboxylate, acyl, $C_1$-$C_4$ alkyl acyl, amine, $C_1$-$C_4$ alkyl amine, amide, or $C_1$-$C_4$ alkyl amide; piperazine with R substituents from each of the cyclic carbons or cyclic nitrogens that are independently H, $C_1$-$C_4$ alkyl, aryl, $C_1$-$C_4$ alkyl aryl, OH, $C_1$-$C_4$ alkoxy, COOH, $C_1$-$C_4$ alkyl carboxylate, acyl, $C_1$-$C_4$ alkyl acyl, amine, $C_1$-$C_4$ alkyl amine, amide, or $C_1$-$C_4$ alkyl amide; R44HN-R45-NHR46 where R44 and R46 are independently H, $C_1$-$C_4$ alkyl, aryl, $C_1$-$C_4$ alkyl aryl, COOH, $C_1$-$C_4$ alkyl carboxylate, acyl, $C_1$-$C_4$ alkyl acyl, amine, $C_1$-$C_4$ alkyl amine, amide, or $C_1$-$C_4$ alkyl amide and R45 is $C_1$-$C_{10}$ alkyl; and combinations thereof.

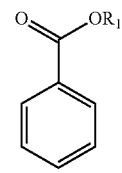

Formula 1

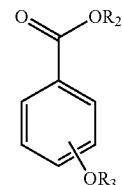

Formula 2

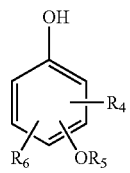

Formula 3

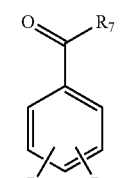

Formula 4

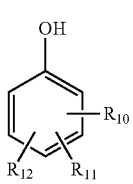

Formula 5

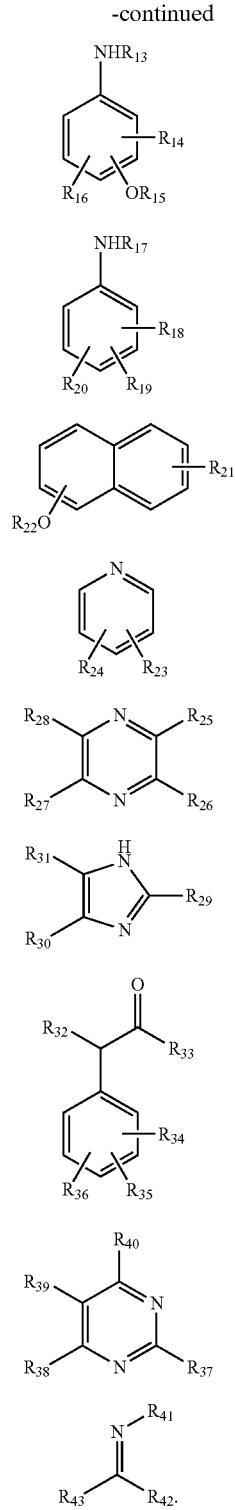

In addition to the formulas of plasticizers identified above, specific examples plasticizer may also be selected from the group consisting of triacetin, diacetin, trimethyl phosphate, triethyl phosphate, tributyl phosphate, triphenyl phosphate, triethyl citrate, acetyl trimethyl citrate, acetyl triethyl citrate, acetyl tributyl citrate, dibutyl phthalate, diaryl phthalate, diethyl phthalate, dimethyl phthalate, dimethyl ethyl phthalate, di-2-methoxyethyl phthalate, di-octyl phthalate, an di-octyl phthalate isomer, dibutyl tartrate, ethyl o-benzoylbenzoate, ethylene glycol dibenzoate, diethylene glycol dibenzoate, dipropylene glycol benzoate, glyceryl tribenzoate, trimethylolethane dibenzoate, pentaerythritol tetrabenzoate, ethyl phthalyl ethyl glycolate, methyl phthalyl ethyl glycolate, n-ethyltoluenesulfonamide, o-cresyl p-toluenesulfonate, o-toluenesulfonamide, p-toluenesulfonamide, aromatic diol, substituted aromatic diols, aromatic ethers, tripropionin, polycaprolactone, polyethylene glycol, polyethylene glycol esters, polyethylene glycol diesters, dimethyl ether of triethylene glycol, dimethyl ether tetraethylene glycol, di-2-ethylhexyl polyethylene glycol ester, glycerol esters, diethylene glycol, polypropylene glycol, polyglycoldiglycidyl ethers, dimethyl sulfoxide, n-methylpyrrolidinone, propylene carbonate, a guiacol phosphate, a guiacol alkyl phosphate, $C_1$-$C_{20}$ dicarboxylic acid esters, lactones, gamma-valerolactone, dimethyl adipate, a dialkyl ester, resorcinol monoacetate, catechol, catechol esters, phenols, epoxidized soy bean oil, castor oil, linseed oil, epoxidized linseed oil, other vegetable oils, other seed oils, difunctional glycidyl ether based on polyethylene glycol, alkylphosphate esters, phospholipids, an aroma, eugenol, cinnamyl alcohol, camphor, methoxy hydroxy acetophenone, Venice turpentine, Canada balsa, glycerin, glycerin esters, gum elemi, vanillin, ethylvanillin, any derivative thereof, and any combination thereof. Among these plasticizers, triacetin and acetyl triethyl citrate are particularly preferred propylene carbonate, g-valerolactone, acetyl triethylcitrate, n-methylpyrrolidinone, glycerin carbonate, 2-methoxyethanol, 1,2-dimethoxyethane, triacetin, glycerol tribenzoate, diethylphthalate, sucrose benzoate, diethylene glycol benzoate, dipropylene glycol benzoate, sucrose acetate isobutyrate, trimethyl phosphate, triethyl phosphate, tributyl phosphate, triphenyl phosphate, triethyl citrate, acetyl trimethyl citrate, acetyl tributyl citrate, dibutyl phthalate, diaryl phthalate, diethyl phthalate, dimethyl phthalate, di-2-methoxyethyl phthalate, di-octyl phthalate (and isomers), dibutyl tartrate, ethyl o-benzoylbenzoate, ethyl phthalyl ethyl glycolate, methyl phthalyl ethyl glycolate, n-ethyltoluenesulfonamide, o-cresyl p-toluenesulfonate, aromatic diol, substituted aromatic diols, aromatic ethers, tripropionin, polycaprolactone, glycerin, glycerin esters, diacetin, polyethylene glycol, polyethylene glycol esters, polyethylene glycol diesters, di-2-ethylhexyl polyethylene glycol ester, diethylene glycol, polypropylene glycol, polyglycoldiglycidyl ethers, dimethyl sulfoxide, $C_1$-$C_{20}$ diacid esters, dimethyl adipate (and other dialkyl esters), resorcinol monoacetate, catechol, catechol esters, phenols, epoxidized soy bean oil, castor oil, linseed oil, epoxidized linseed oil, other vegetable oils, other seed oils, difunctional glycidyl ether based on polyethylene glycol, alkylphosphate esters, phospholipids, aromas (including some described herein, e.g., eugenol, cinnamyl alcohol, camphor, methoxy hydroxy acetophenone (acetovanillone), vanillin, and ethylvanillin), and the like, any derivative thereof, and any combination thereof.

In some aspects, the plasticizer may be selected from the group consisting of propylene carbonate, g-valerolactone, acetyl triethylcitrate, N-methylpyrrolidinone, glycerin carbonate, 2-methoxyethanol, 1,2-dimethoxyethane, triacetin, glycerol tribenzoate, diethylphthalate, sucrose benzoate, diethylene glycol benzoate, dipropylene glycol benzoate, sulfonamides, n-ethyl toluene sulfonamide, sucrose acetate isobutyrate, arylene sulfonamides, ethyl toluene sulfonamide, glycerin esters, citrate esters, and combinations thereof.

The plasticizer may be present in an amount from 3 wt. % to 20 wt. % based on the total weight of the binder composition. For example, the plasticizer may be present in an amount from 3 wt. % to 18 wt. %, e.g., from 3 wt. % to 15 wt. %, from 4 wt. % to 15 wt. %, from 4 wt. % to 12 wt. %, from 5 wt. % to 10 wt. %, or from 6 wt. % to 9 wt. %. As used herein, the term "plasticizer" refers to a component that increases the plasticity or fluidity of a material. In some aspects, a component may be introduced as an organic solvent but as the organic solvent is evaporated, it begins to function as a plasticizer. As explained herein, however, the binder composition comprises a plasticizer and at least one organic solvent and thus even if an organic solvent begins to function as a plasticizer as it is added, the binder composition also contains a plasticizer that functions as a plasticizer as initially added. In other words, the cellulose acetate is plasticized in solution. In some aspects, the plasticizer may be the same as one of the at least one organic solvent. In other aspects, the plasticizer is different from any of the organic solvents.

Organic Solvent

The at least one organic solvent in the binder composition may be an organic solvent generally known to one skilled in the art, including but not limited to aliphatic and aromatic solvents such as alcohols, ketones, esters, acetates, glycol ethers, and the like. In some aspects, the solvent may be selected from the group consisting of acetone, n-butyl acetate, ethyl acetate, isopropanol, ethanol, cyclohexanone, methyl ethyl ketone, diacetone alcohol, isobutanol, ethyl lactate, methyl amyl ketone, methyl propyl ketone and dimethyl carbonate, and combinations thereof. For example, the solvent may be a combination of alcohols, acetone, and acetates, e.g., n-butyl acetate, ethyl acetate, acetone, and isopropanol. In other examples, the solvent may include n-butyl acetate, ethyl acetate, acetone, and ethanol. In some aspects, methyl ethyl ketone or dimethyl carbonate are preferred over ethyl acetate or butyl acetate. In further examples, as explained herein, a plasticizer may initially be added as a solvent. Such plasticizers include, propylene carbonate and gamma-valerolactone. The binder composition may include one or more solvents as described herein in an amount of from 60 wt. % to 92 wt. %, e.g., from 60 wt. % to 85 wt. % or from 65 wt. % to 85 wt. %.

In some aspects, more than one organic solvent is used, e.g., two organic solvent, three organic solvents, four organic solvents, five organic solvents, or more than five organic solvents. The organic solvents may be selected so that each organic solvent has a different boiling point. This combination of organic solvents selected based on boiling point may be referred to as a layered solvent system. The boiling point of the second organic solvent may be at least 5° C. greater than the boiling point of the first organic solvent, e.g., at least 10° C., or at least 15° C. The boiling point of the third solvent may then be at least 5° C. greater than the boiling point of the second organic solvent, e.g., at least 10° C., or at least 15° C. This trend may continue for as many organic solvents as are included. For example, acetone has a boiling point of 56° C., ethyl acetate has a boiling point of 77.1° C., isopropanol has a boiling point of 82.6° C., and n-butyl acetate has a boiling point of 126° C. Generally, the first organic solvent is present in the greatest amount and is the most compatible with cellulose acetate. The advantage of such a layered solvent system is that as the first organic solvent, such as acetone, is evaporated during the drying cycle, the less compatible but higher boiling point organic solvents remain for a longer duration across the drying cycle, leading to binder formation in the final use of the formulation, e.g., as a wood filler. In a binder composition comprising more than one organic solvent, the first organic solvent may be present in an amount from 35 to 90 wt. %, e.g., from 60 to 85 wt. % or from 60 to 80 wt. %; the second and third organic solvents may be present from 1 to 20 wt. %, e.g., from 2 to 20 wt. % or from 5 to 20 wt. %. If present, additional organic solvents may be present from 0.001 to 8 wt. %, e.g., from 0.5 to 7 wt. % or from 1 to 5 wt. %.

In some aspects, the binder composition may be a LOVOC (low volatile organic compound) binder composition, a NOVOC (no volatile organic compound) binder composition, or may use VOC exempt organic solvents (a volatile organic compound which has been determined to have negligible photochemical activity as promulgated by the U.S. environmental Protection Agency). A volatile organic compound is generally defined as any compound of carbon, excluding carbon monoxide, carbon dioxide, carbonic acid, metallic carbides or carbonates, and ammonium carbonate, which participates in atmospheric photochemical reactions. N-butyl acetate is an example of an organic solvent that is not a volatile organic compound. Acetone and dimethyl carbonate are both examples of VOC exempt organic solvents. Isopropanol is an example of a volatile organic compound. In some aspects, the binder composition comprises acetone and/or dimethyl carbonate as the organic solvents, and the binder composition is then VOC exempt.

Additives

In some embodiments, the binder compositions may further comprise one or more additional additives. Such additives may be added to the binder composition when the binder composition is initially formed, or may be added in a downstream process, either before, during or after forming the wood filler composition. The additives may include adhesion promoters, heat stabilizers, antioxidants, acid scavengers, dyes, pigments, aromas, optical brighteners, flame retardants, agricultural chemicals, bioactive compounds, indicators, and mixtures thereof. The amount of the additives may vary widely. Generally speaking, the one or more additional additives may be present in an amount ranging from 0.01 to 10 wt. %, based on the total weight of the binder composition, e.g., from 0.05 to 8 wt. % or from 0.1 to 7.5 wt. %. Additional details for the above-mentioned components are provided below.

As explained above, cellulose acetate is generally incompatible with natural resins and rosins, often referred to as tackifiers. As used herein, a tackifier functions to increase the tackiness and stickiness of a composition, and is a polymer typically having a high glass transition temperature. An adhesion promoter, as used herein, is an additive included to increase the final adhesion of the composition and need not be a polymer. The adhesion promoter may also be considered a secondary binder, with cellulose acetate being the primary binder. "Adhesion promotor" as used herein excludes natural resins and rosins. Without being bound by theory, it is believed that the cellulose acetate forms a continuous phase, with plasticizer and other additives dispersed therein.

The adhesion promoters may be an adhesion promoter generally known to one skilled in the art. Adhesion promoters include, but are not limited to 5-membered nitrogen containing rings, amine-containing compounds, imine-containing compounds, amide-containing compounds, silane-containing compounds, alkoxy-containing compounds, methacrylate esters, and acrylate esters. While the amines and imines are not generally understood to be adhesion promoters, the inventors have found that in the present binder compositions, the amines and imines do act as adhesion promoters. In some aspects, the adhesion promoter may be selected from the group consisting of phenylurea, urea, 3-aminopropyltriethoxysilane, polyethyleneimine, sulfonamides (including aryl sulfonamides), aryl amines, cyclic amine compounds, such as pyrroles, pyrimidines, pyrazines, imidazoles, and pyrrolidines, and combinations thereof. The adhesion promoter may be present from 0.1 to 10 wt. %, e.g., from 0.5 to 10 wt. % or from 1 to 10 wt. %, based on the total weight of the binder composition. The amount of adhesion promoter used may depend on its compatibility with cellulose acetate. For example, if the adhesion promoter has low or limited compatibility with cellulose acetate, such as an alkyd, a lower amount of adhesion promoter may be used. Additionally, the molecular weight of the cellulose acetate affects the compatibility of the adhesion promoter with the cellulose acetate; as the number average molecular weight of the cellulose acetate decreases, compatibility increases.

Dyes may be used to provide a desired toning or visual effect. The dyes may be selected from the group consisting of C. I. Solvent Violet 13, C. I. PigmentBlue 15, C. I. Pigment Blue 28, C. I. Dispersion Violet 8, C. I. Pigment Red 122, and mixtures thereof. Examples of fluorescent dyes or optical brightener dyes include those selected from the group consisting of Eccowhite and Eccobright products (available from Eastern Color & Chemical Company), Eastobrite OB-I (available from Eastman Chemical Company), fluorescein, and mixtures thereof. Examples of specialty or novelty dyes include thermochromic and photochromic dyes.

Examples of suitable aromas, repellant scents, odor neutralizers, and odor masks include, but are not limited to, those disclosed in Fabulous Fragrances, by Jan Moran; Fragrances of the World, by Michael Edwards; The Illustrated Encyclopedia of Essential Oils, by Julia Lawless; Chemistry of Fragrant Substances, by Paul Jose Teisseire; The Fragrance Foundation Reference Guide 1999, The Fragrances Foundation (New York, 1999), each incorporated by reference herein. Specific fragrances may be selected from the group consisting of pennyroyal, vanillin, esters, linalool, citronellal, certain aldehydes and esters, complex perfume mixtures, plant extracts, and mixtures thereof.

Examples of suitable indicators for use in the present invention include pH indicators, moisture indicators, redox indicators, and temperature indicators. Examples of suitable pH indicators include those selected from the group consisting of phenolphthalein, litmus, thymol blue, tropeolin 00, methyl yellow, methyl orange, bromophenol blue, bromocresol green, methyl red, bromothymol blue, phenol red, neutral red, thymolphthalein, alizarin yellow, tropeolin O, nitramine, and trinitrobenzoic acid. An example of a moisture indicator is cobalt chloride. Examples of temperature indicators include thermochromic dyes, such as indoine blue, spiropyran derivatives. Examples of suitable redox indicators include those selected from the group consisting of ferroin, iodine/starch, bis(4-dialkylaminophenyl) squaraine dyes, $KMnO_4$, and $K_2Cr_2O_7$.

Examples of insecticides include those selected from the group consisting of organochlorine compounds, organophosphate compounds, aryl compounds, heterocyclic compounds, organosulfur compounds, carbamate compounds, formamidine compounds, dinitrophenol compounds, organotin compounds, pyrethroid compounds, acylurea compounds, botanical compounds, antibiotic compounds, fumigant compounds, repellant compounds, inorganic compounds, and mixtures thereof.

The binder composition is substantially free from tackifiers. As used herein, the term "substantially free" of a particular component or substance means that the binder composition or wood composition may include less than 0.1%, e.g., less than 0.01%, less than 0.001%, less than 0.0001%, or 0% of that component or substance based on the weight of the binder composition or wood composition. Thus, "substantially free of tackifiers" means that the binder composition or wood composition may include less than 0.1%, e.g., less than 0.01%, less than 0.001%, less than 0.0001%, or an undetectable amount of tackifiers based on the weight of the binder composition or wood composition. In some embodiments, the binder composition is substantially free from rosins and rosin derivatives, such as rosin esters and ester gum, and hydrocarbon tackifiers, such as aliphatic, aromatic, and dicyclopentadiene tackifiers.

III. Wood Filler Composition

The wood filler composition of the present invention comprises a binder composition and a filler. The binder composition for use in the wood filler composition is as described above. The binder composition comprises cellulose acetate, a plasticizer, and an organic solvent. The binder composition may optionally comprise one or more additives, as described above.

The filler in the wood filler composition may be selected from the group consisting of cellulose, wood flour, nut bark flour, wood fiber, calcium carbonate, calcium sulfate, montmorillonite clay, talc, magnesium sulfate, sodium sulfate, inorganic salts, microspheres (including ceramic microspheres, glass microspheres, and siliceous volcanic rock microspheres), cotton flock, ground peat, cork, magnesium silicate, aluminum silicate, starches, other organic and inorganic fillers known to those of skill in the art, and combinations thereof. In some aspects, the filler comprises wood flour. In further aspects, the filler is a combination of wood flour and at least two other fillers, such as calcium carbonate and microspheres. In these aspects, the ratio of wood flour to the at least two other fillers ranges from 1:1 to 1:20, e.g., from 1:2 to 1:10 or from 1:3 to 1:8 When included, microspheres may be present in the filler composition from 1 to 20 wt. %, e.g., from 5 to 15 wt. % or from 7 to 12 wt. %. Microspheres, especially glass microspheres, are advantageous because of their stainability and high crush strength (greater than 400 psi). When microspheres are included in the filler, the adhesion promotor may be reduced in concentration or entirely omitted.

The filler may be present in the wood filler compositions in an amount of from 35 wt. % to 65 wt. % based on the total weight of the wood filler composition. For example, the filler may be present in an amount from 35 wt. % to 60 wt. %, e.g., from 40 wt. % to 55 wt. %, or from 45 wt. % to 50 wt. %. The amount of filler in the wood filler composition may be adjusted such that the cellulose ester is present in the wood filler composition in an amount from 3 wt. % to 10 wt. % based on the total weight of the wood filler composition. For example, the filler can be included in an amount such that the cellulose ester is present in an amount of from 5.5 wt. % to 7.5 wt. % or from 6 wt. % to 7 wt. %. The amount of filler in the wood filler composition may be adjusted such that the plasticizer is present in the wood filler composition in an amount from 2 wt. % to 7.5 wt. %, e.g., from 3 wt. % to 7 wt. % or from 3.5 wt. % to 6 wt. %, based on the total weight of the wood filler composition. As described above, the additives recited herein may be added to the binder composition or may be added to the wood filler composition.

IV. Methods of Using Binder Composition and Wood Filler Composition

The present invention also includes methods of using binder compositions and wood filler compositions. The binder compositions may be used to coat, at least partially, a substrate. In some aspects, the substrate may be a wood substrate, e.g., untreated wood or treated wood. In embodiments in which the substrate is treated wood, the treated wood may be painted wood or stained wood.

The wood filler compositions may be used to fill a cavity in a substrate. In some aspects, the methods may comprise applying a wood filler composition as described herein to an inner surface of the substrate.

The binder composition or wood filler composition may be dried and adhered onto the substrate. The shear strength can be measured using methods known to those of skill in the art, as further described in the Examples section.

The present invention will be better understood in view of the following non-limiting examples.

V. Examples

Example 1

A cellulose acetate wood filler was prepared according to Formulation D in U.S. Pat. No. 1,947,438 and is provided as a comparative example. Formulation D was then reformulated without resin and it was observed that the non-tackified material exhibited much greater adhesion to treated surfaces than did the Formulation D.

In initial studies, the strength of a solvented CA was evaluated as the force required to induce shear failure (Method 1). This method was developed as a pre-screen of the cellulose acetate formulation before full application testing of the final binder formulation prepared with filler (wood flour and calcium carbonate). When tested on bare, untreated pine, some solvented formulations could achieve comparable shear strength to a final binder formulation of nitrocellulose wood filler (155 kgF).

During investigations, however, it was discovered that the testing was very application sensitive and that good performance under one test method does not correlate to equal performance in other application testing.

While the system was surprisingly tunable, the optimization was complex as common ingredients such as tackifying resins which may seem to increase adhesion performance under preliminary testing did not improve the desired surface adhesion in the application tests of the final binder formulation (Method 3).

Sample Preparation and Testing Methods

Binder compositions and wood filler compositions were prepared for adhesion and strength testing. The specific compositions tested are provided in the examples that follow. Generally, the binder compositions contained a cellulose ester, a plasticizer, a volatile solvent, and/or an additive (e.g., an adhesion promoter). The wood filler compositions generally contained a cellulose ester, a plasticizer, a volatile solvent, and/or an additive (e.g., an adhesion promoter), along with a filler. For comparative purposes, binder compositions and wood filler compositions were prepared that additionally contained a tackifier, such as a rosin or rosin ester. An exemplary composition for the comparative examples and the inventive examples is provided below. In the inventive composition, the volatile solvent was present in a total amount of 43 wt. % and included a mixture of acetone (34 wt. % of composition), n-butyl acetate (2 wt. % of composition), isopropanol (1.6 wt. % of composition), and ethyl acetate (5 wt. % of composition). The wood filler in the inventive composition was 38 wt. % $CaCO_3$ and 9 wt. % wood flour, providing a total of 47 wt. % filler based on the weight of the composition.

For comparison purposes, the composition of DAP® Plastic Wood SDS (DAP Products Inc., Baltimore, Md.) is also provided below. The volatile solvent in the DAP® Plastic Wood sample included acetone (15-40 wt. % of the composition), n-butyl acetate (5-10 wt. % of the composition), and isopropanol (1-5 wt. % of the composition). The filler in the DAP® Plastic Wood sample included 30-60 wt. % $CaCO_3$ and 7-13 wt. % cellulose.

TABLE 1

| | Comparative Compositions | | Inventive |
| --- | --- | --- | --- |
| | Formulation D (wt %) | DAP ® Plastic Wood SDS (wt %) | Composition Weight % |
| Cellulose ester | 9% | 1-5% | 7% |
| Plasticizer | 4% | Not reported | 2% |
| Volatile solvent | 58% | 21-55% | 43% |
| Additive | — | Not reported | 1% |
| Tackifier | 5% | Not reported | — |
| Filler | 23% | 37-73% | 47% |

"-" indicates that a component was not present. Adhesion and strength for the comparative and inventive binder compositions and the wood filler compositions were tested by one of the methods listed below, i.e., film formation and adhesion measurements, or filler adhesion to treated wood measurements.

Test Method 1: Lap Shear Testing

Two pine specimens (3.5"×1.5"×0.25") were glued together (overlapping area 1"×1.5") using the film-forming compositions. The film-forming composition was applied in a thin coat using a spatula on one specimen. The two specimens were then clamped together and allowed to dry for 16-24 hours at room temperature. The specimen was then clamped in an Instron and tested for maximum load (shear strength) with load at 800 lbf/min.

Test Method 2: Film Formation and Adhesion of Film-Forming Composition

A pine wood specimen (3.5"×1.5"×0.25") was either stained using Minwax Puritan Pine Stain (Minwax Company, Upper Saddle River, N.J.) or painted using Premium Quality interior acrylic latex flat wall paint, advanced scrubbable formula (Davis Frost, Inc.; Lynchburg, Va.) and allowed to dry for 24 hours. A small area (1"×1.5") of the specimen was then coated with a thin layer of the film-forming composition. The film-forming composition was applied by hand using a spatula. The coating was allowed to air dry for approximately 16-24 hours at room temperature. The resulting coating was evaluated for its appearance and adhesion to the pine specimen. Using a spatula, attempts were made to remove the film by scraping and/or peeling. Adhesion was ranked poor-excellent (on a scale from 1-5, where 1 is poor and 5 was excellent) by the difficulty to remove the film, cohesion of the film and residue left on specimen.

Test Method 3: Wood Filler Composition Adhesion to Treated (Stained/Painted) Wood The binder composition was added to a mix of $CaCO_3$ and wood flour (5.9:4.2:1) to prepare a wood filler composition. A filled specimen was prepared by drilling holes of ¾" diameter and ¼" deep in plywood panels or pine. The unfinished wood specimens were painted with Premium Quality interior acrylic latex flat wall paint, advanced scrubbable formula or stained with Minwax Wood Finish (puritan pine finish). The prepared wood was dried overnight at room temperature. Using a putty knife, the holes were filled with the final wood filler composition to a level above the surface and dried overnight. The wood filler composition was then tested for adhesion, along with DAP® Plastic Wood, a commercially available wood filler from DAP Products Inc. (Baltimore, Md.), as a control benchmark. The dried material above the surface was scraped and peeled in attempts to remove the filler from the surface of the wood. The rankings were made using either a Pass/Fail system or a 1-5 rating system (where "5" indicated a pass with good adhesion, "3" indicated average adhesion, and "1" was weak or no adhesion.

Influence of Tackifier Type in Binder Compositions:

During a survey of a number of tackifiers (modified and natural rosin esters and terpene phenolics), a differentiation in shear strength was noted amongst the different tackifier types when tested in the binder compositions, as shown in Table 2.

TABLE 2

| Comp. | Tackifier Type | CA (wt. %) | Tackifier (wt. %) | Shear Force (kgF) |
|---|---|---|---|---|
| 1 | terpene phenolic | 7.6 | 6.8 | 33 |
| 2 | polymerised rosin | 12.6 | 6.6 | 52 |
| 3 | modified rosin ester | 12.5 | 6.5 | 77 |
| 4 | no rosin | 15.9 | — | 92 |
| 5 | hydrocarbon resin | 7.6 | 6.9 | 97 |
| 6 | glycerol rosin ester | 12.5 | 6.9 | 111 |
| 7 | rosin ester | 12.5 | 6.8 | 120 |
| 8 | pentaerythritol ester rosin | 12.5 | 7.0 | 137 |
| 9 | maleated glycerol ester | 12.4 | 7.1 | 143 |

However, when fully formulated and tested in the final wood filler compositions, the tackified formulations exhibited poor adhesion to either painted or stained wood. Specifically, initial testing of these solvented tackified materials in a final formulation using Test Method C routinely yielded poor performance, i.e., minimal to no adhesion to treated wood specimens (stained/painted). Even with those samples which exhibited higher shear strength, e.g., maleated glycerol ester, this did not translate to the anticipated adhesion strength. Thus, the performance of the tackifiers while in the film-forming compositions (as shown in Table 2 above) was not predictive of the adhesion performance when formulated as a wood filler composition.

Influence of Plasticizers and Solvent:

To determine the impact of plasticizers and solvents on adhesion in wood filler compositions, samples were prepared in which the types and amounts of plasticizers and solvents were varied. Each of the samples included 6.6-7.2 wt. % cellulose acetate, inert filler, and the indicated amounts of plasticizer, solvent, and rosin. Compositions 10 and 12-16 each included approximately 2 wt. % Velsiflex™ 320 (Velsicol Chemical LLC; Rosemont, Ill.), which is a mixture of diethylene glycol benzoate and dipropylene glycol dibenzoate, as a primary plasticizer, along with a secondary (2°) plasticizer as indicated in Table 3. Composition 11 included triacetin (TA) as the only plasticizer. The sample compositions and data are shown in Table 3. The adhesion of the final formulation to stained wood and painted wood was determined. Each sample was assigned a score of "F" for failed adhesion, "A" for average adhesion, "G" for good adhesion, and "P" for excellent levels of adhesion.

While improvements in final performance were not achieved by alterations in the rosin content, significant enhancements were seen with modifications in solvent and plasticizer concentration/composition. See Table 3. Various tackified formulations often yielded performance ratings of Fail or Average. Interestingly, various plasticizer-solvents replacements not only improved performance, but also tuned performance without the use of rosins.

TABLE 3

| Comp. No. | 2° Plasticizer | Wood Filler Composition | | | | Adhesion of Wood Filler Formulation | |
|---|---|---|---|---|---|---|---|
| | | Total Pz | 2° Pz | Solvent | Rosin | Stained Wood | Painted Wood |
| 10 | g-Valerolactone w/Rosin Ester | 9% | 7% | 34% | 4% | F | F |
| 11 | Triacetin w/ Polymerized Rosin | 2% | | 41% | 4% | A | F |
| 12 | g-Valerolactone | 9% | 7% | 36% | — | F | P |
| 13 | Glycerin Carbonate | 9% | 7% | 36% | — | F | P |
| 14 | 2-Methoxyethanol | 9% | 7% | 36% | — | G | F |
| 16 | 1,2 Dimethoxyethane | 9% | 8% | 36% | — | G | F |

Comparison of Adhesion of Formulation as a Coating (i.e., Binder Composition) and in Final Formulation (i.e., Wood Filler Composition):

Painted and stained wood specimens were coated with the binder composition as described in Test Method 2. The compositions included 11-15 wt. % cellulose acetate, a plasticizer, solvents (including 59-68 wt. % acetone, n-butyl acetate or ethyl acetate, and isopropanol or ethanol), and optionally an additive. The plasticizers included propylene carbonate (PrC), gammaValerolactone (γ-VL), n-methylpyrrolidinone (NMP), and acetyl triethyl citrate (ATEC). The additives included aminopropyltriethoxysilane (APTES)

and phenylurea. The coated specimens were evaluated based on the ability of the dried film to adhere to the specimen surface. Variations in the composition yielded unexpected performance differences, not only in adhesion of the CA film to the different treated substrates, but also in the adhesion of in the final wood filler compositions to the treated surfaces. Improvements in film adhesion did not always translate to substrate adhesion in the final formulations. The test results are shown in Table 4.

TABLE 4

| Comp. No. | Plasticizer | nBuOAc or EtOAc | ROH | Additive | Film Adhesion 0-5 | | Filler Adhesion 0-5 | |
|---|---|---|---|---|---|---|---|---|
| | | 11-15 wt. % CA, 59-68 wt. % Acetone | | | Stain | Paint | Stain | Paint |
| 17 | 6% PrC | nBuOAc 11% | iPOH 3% | — | 5 | 3 | 1 | 1 |
| 17a | 6% PrC | EtOAc 11% | iPOH 3% | — | 5 | 3 | 4 | 5 |
| 17b | 5% γ-VL | nBuOAc (13%) | iPOH 3% | — | 5 | 5 | 4 | 1 |
| 17c | 11% γ-VL | nBuOAc (5%) | iPOH 3% | — | 5 | 5 | 3 | 4 |
| 17d | 7.4% NMP | nBuOAc (6.7%) | iPOH 1.5% | — | 5 | 5 | 1 | 5 |
| 18 | 4.3% PrC | nBuOAc/EtOAc 5.4%/5.4% | EtOH 3.2% | 0.6% APTES | 3 | 2 | 5 | 5 |
| 19 | 6% PrC | nBuOAc/EtOAc 6.6%/6.6% | EtOH 3.0% | 2% Phenylurea | 5 | 4 | 1 | 4 |
| 20 | 6% ATEC and 7% γ-VL | nBuOAc (13%) | iPOH 3% | — | 1 | 5 | 1 | 1 |

A change in solvent from n-butyl acetate (Composition 17) to ethyl acetate (Composition 17a) dramatically increased the adhesion of the final wood filler formulation to both wood substrates. A change in plasticizer from propylene carbonate (Composition 17) to g-valerolactone (Composition 17b) made the adhesion preferential to stain. If the g-VL was increased (Composition 17c), then an increase in adhesion to stained substrates was noted. However, a change in plasticizer to n-methylpyrrolidinone (Composition 17d) reversed the preferential adhesion to painted wood surfaces without impacting the adhesion of the film.

Inclusion of an adhesion promoter, such as APTES (Composition 18) improved the adhesion performance towards all the various substrates. Other combinations of plasticizers, solvents (Compositions 19 and 20) enhanced selective adhesion of the film. Consequently, selective adhesion of the formulation either as a film or in a final wood filler formulation was a complex optimization of plasticizer(s), solvents, and additives and their concentrations.

Example 2

Additional testing, using the test methods described above in Example 1, was performed to determine the adhesion capacity of wood filler compositions as shown in Table 5. The compositions were evaluated to determine the effect that solvent and additive changes have on the adhesion performance of the compositions.

TABLE 5

| Comp. No. | Propylene Carbonate | nBuOAc/ EtOAc | iPOH or EtOH (3%) | Additive | Filler Adhesion 0-5 | |
|---|---|---|---|---|---|---|
| | | | | | Stain | Paint |
| 21 | 6% | nBuOAc (14%) | iPOH | imidazole (2%) | 4 | 1 |

TABLE 5-continued

| Comp. No. | Propylene Carbonate | nBuOAc/ EtOAc | iPOH or EtOH (3%) | Additive | Filler Adhesion 0-5 | |
|---|---|---|---|---|---|---|
| | | | | | Stain | Paint |
| 21a | 6% | nBuOAc (14%) | iPOH | imidazole (4%) | 2.5 | 2.5 |
| 21b | 6% | nBuOAc (11%) | iPOH | none | 1 | 1 |
| 21c | 6% | nBuOAc (14%) split 7/7 | EtOH | imidazole (2%) | 3.5 | 1 |
| 21d | 6% | nBuOAc/ EtOAc | EtOH | imidazole (2%) | 4.2 | 4.5 |

As shown in Table 5, filler adhesion to painted wood varied depending on solvent rather than adhesion promoter. Compositions containing imidazole, an adhesion promoter, had superior adhesion to painted wood as compared to compositions without an adhesion promoter.

Example 3

Additional testing, using the test methods described above in Example 1, was performed to determine the adhesion capacity of binder compositions and wood filler compositions as shown in Table 6. The compositions were evaluated to determine the effect that tackifiers, and additives have on the adhesion performance of the compositions.

TABLE 6

| Comp No. | PZ1: v320 | PZ2 | nBuOAc | iPOH or EtOH (3%) | Tackifier/ Additive | Filler Adhesion 0-5 Stain | Paint |
|---|---|---|---|---|---|---|---|
| 22 | 4% | gVL (13%) | | iPOH | rosin ester (7%) | F | F |
| 22a | 4% | gVL (14%) | | iPOH | | 4 | 4.5 |
| 22b | 3% | gVL (7%) | 14% | iPOH | | 1 | 1 |
| 22c | 3% | gVL (7%) | 13% | iPOH | imidazole (2%) | 2 | 3 |

The formulations in Table 6 included cellulose acetate in a concentration range of 12 wt. %-15 wt. %; acetone in the range of 59 wt. %-66 wt. %; n-butylacetate (nBuOAc), when present, in an amount of approximately 14 wt. %; an alcohol (isopropanol (iPOH)) in an amount of approximately 3 wt. %, a primary plasticizer (Velsiflex™ 320; Velsicol Chemical, Rosemont, Ill.) in an amount of 3 wt. %-4 wt. %, a secondary plasticizer or a solvent in an amount of 7 wt. %-14 wt. %, and a tackifier in an amount of 7 wt. %.

Several compositions were tested with and without rosin ester. While differences in lapshear were noted using various tackifiers in the binder compositions (see above), this did not translate to the expected enhanced performance in the wood filler composition.

Several similar compositions (12%-14% CA; ~60% Acetone; 13% nBuOAc, ~3% iPOH and 3% plasticizer (Velsiflex 320)) were tested with different tackifiers, including rosin esters and a terpene phenolic. All of these compositions failed in adhesion to both stained and painted surfaces.

Example 4

Wood filler compositions were prepared and tested, using the methods described in Example 1, for adhesion to untreated, stained, and painted substrates. The compositions each included cellulose acetate, diethyl phthalate, and filler (wood flour) in the amounts shown for Formulation D in Table 1. Composition 23, equivalent to Formulation D, included the tackifier Sylvalite 80HP, which is a rosin ester commercially available from Arizona Chemical (Jacksonville, Fla.). Composition 24 did not include any tackifiers or additives. Composition 25 included 2.3 wt. % of imidazole as the additive.

TABLE 7

| Comp. No. | Plasticizer | Additive | Adhesion Untreated Substrate | Adhesion to Stained Substrate | Adhesion to Painted Substrate |
|---|---|---|---|---|---|
| 23 | DEP | 80HP (5%) | 5 | 0 | 0 |
| 24 | DEP | — | 4 | 1 | 2 |
| 25 | DEP | Imidazole (2.3%) | 5 | 2.5 | 5 |

Comparatively, Composition 23 visually dried away (i.e., separated) from both treated substrates. Both Compositions 24 and 25 (i.e., the formulations without the tackifier) dried better, with less of a gap between the filler and substrate surface. Composition 23 had no adhesion to either the painted or stained surfaces, but the adhesion to untreated bare wood was good. Composition 24 displayed much better adhesion to paint and improved adhesion to stain, but a somewhat reduced adhesion to the bare surface. Adding a small amount of imidazole (Composition 25) improved adhesion to the treated surfaces, while maintaining adhesion to the untreated surface. In a test of sandability, Composition 23 was more difficult to sand and tended to gum up the sand paper while Compositions 24 and 25 sanded easily. The stainability and paintability of all formulations appeared to be comparable, though more even and darker in Composition 24.

Example 5

Wood filler compositions were prepared with varied organic solvents and tested for application, sandability, screw anchor, and adhesion to stained wood. Each test ranked the parameter from 1 to 5, with 5 being the best. Each of the below compositions comprise 38.3 wt. % calcium carbonate, 9 wt. % wood flour, and 53.0 wt. % binder composition.

TABLE 8

| | Comp. No. 26 | Comp No. 27 | Comp. No. 28 |
|---|---|---|---|
| Organic Solvent | Ethyl Acetate | Dimethyl Carbonate | Methyl Ethyl Ketone |
| Application | 4 | 4 | 5 |
| Sandability | 4 | 4 | 5 |
| Screw Anchor | 3 | 4 | 5 |
| Adhesion to Stained Wood | 3 | 3 | 3.5 |
| Total (out of 20) | 14 | 15 | 18.5 |
| % Performance | 70 | 75 | 93 |

As shown in Table 8, methyl ethyl ketone had the best performance in each category and overall but ethyl acetate and dimethyl carbonate also had acceptable performance. Since both ethyl acetate and dimethyl carbonate are VOC exempt solvents, a VOC exempt solvent wood filler composition made according to the present invention resulted in acceptable performance.

Example 6

Wood filler compositions were prepared with propylene carbonate as the plasticizer, ethyl acetate as the organic solvent in the base formula, and with varied additives fillers.

TABLE 9

| Comp. No. | Percent Base Formula | Percent Wood Flour | Percent Calcium Carbonate | Filler Additive | Percent Filler Additive |
|---|---|---|---|---|---|
| 29 | 53.0 | 9.0 | 38.0 | None | — |
| 30 | 53.0 | 7.2 | 30.4 | Glass Microspheres | 9.4 |
| 31 | 53.0 | 7.2 | 30.4 | Ceramic Microspheres | 9.4 |
| 32 | 53.0 | 7.2 | 30.4 | Volcanic Glass Microspheres | 9.4 |

Each of the above compositions was tested for application, sandability, hardness, shrinkage/cracking, paintabilty, stainability, screw anchor, and adhesion to stained wood. Each test ranked the parameter from 1 to 5, with 5 being the best.

TABLE 10

| Comp. No. | 29 | 30 | 31 | 32 |
|---|---|---|---|---|
| Application | 3 | 4 | 5 | 5 |
| Sandability | 3 | 5 | 5 | 5 |
| Screw Anchor | 5 | 5 | 5 | 5 |
| Adhesion to Stained Wood | 2 | 3.5 | 3.5 | 3.5 |
| Total (out of 20) | 14 | 17.5 | 18.5 | 18.5 |
| % Performance | 70 | 88 | 93 | 93 |

As shown in Table 10, by including a microsphere filler, performance is improved.

While the invention has been described in detail, modifications within the spirit and scope of the invention will be readily apparent to those of skill in the art. It should be understood that aspects of the invention and portions of various embodiments and various features recited above and/or in the appended claims may be combined or interchanged either in whole or in part. In the foregoing descriptions of the various embodiments, those embodiments which refer to another embodiment may be appropriately combined with other embodiments as will be appreciated by one of ordinary skill in the art. Furthermore, those of ordinary skill in the art will appreciate that the foregoing description is by way of example only, and is not intended to limit the invention.

We claim:

1. A binder composition, comprising:
   from 5 to 40 wt. % cellulose acetate;
   from 3 to 20 wt. % plasticizer; and
   from 57 to 92 wt. % of at least one organic solvent,
   wherein the binder composition is substantially free from tackifiers.

2. The binder composition of claim 1, wherein the composition comprises at least two organic solvents.

3. The binder composition of claim 1, wherein the cellulose acetate is present in an amount of from 7 to 20 wt. % based on the total weight of the binder composition.

4. The binder composition of claim 1, wherein the plasticizer is selected from the group consisting of propylene carbonate, g-valerolactone, acetyl triethylcitrate, n-methylpyrrolidinone, glycerin carbonate, 2-methoxyethanol, 1,2-dimethoxyethane, triacetin, glycerol tribenzoate, diethylphthalate, sucrose benzoate, diethylene glycol benzoate, dipropylene glycol benzoate, sulfonamides, n-ethyl toluene sulfonamide, sucrose acetate isobutyrate, and combinations thereof.

5. The binder composition of claim 1, wherein the plasticizer is present in an amount of from 3 to 15 wt. % based on the total weight of the binder composition.

6. The binder composition of claim 1, wherein the at least one organic solvent is selected from the group consisting of acetone, n-butyl acetate, ethyl acetate, isopropanol, methyl ethyl ketone, cyclohexanone, ethanol, ethyl lactate, dimethyl carbonate, diacetone alcohol, and combinations thereof.

7. The binder composition of claim 1, further comprising an additive.

8. The binder composition of claim 7, wherein the additive is an adhesion promoter.

9. The binder composition of claim 7, wherein the additive is an amine-containing compound or an imine-containing compound.

10. The binder composition of claim 7, wherein the additive is selected from the group consisting of phenylurea, urea, 3-aminopropyltriethoxysilane, polyethyleneimine, imidazole, a sulfonamide, 1-methyl imidazole, n-methylpyrrolidinone, caprolactam and combinations thereof.

11. A wood filler composition, comprising:
   a binder composition comprising from 5 to 40 wt. % cellulose acetate; from 3 to 20 wt. % plasticizer; and from 57 to 92 wt. % of at least one organic solvent; and
   a filler in an amount of from 35 to 65 wt. % based on the total weight of the wood filler composition; wherein the wood filler composition is substantially free from tackifiers.

12. The wood filler composition of claim 11, wherein the filler is selected from the group consisting of cellulose, wood flour, magnesium sulfate, calcium sulfate, calcium carbonate, microspheres, cotton flock, ground peat, cork, magnesium silicate, aluminum silicate, montmorillonite clay, starch, and combinations thereof.

13. The wood filler composition of claim 11, wherein the filler is present in an amount of from 35 to 60 wt. % based on the total weight of the wood filler composition.

14. The wood filler composition of claim 11, wherein the cellulose acetate is present in an amount from 3 to 20 wt. % based on the total weight of the wood filler composition.

15. The wood filler composition of claim 11, wherein the plasticizer is selected from the group consisting of propylene carbonate, g-valerolactone, acetyl triethylcitrate, triethyl citrate, N-methylpyrolidinone, glycerin carbonate, 2-methoxyethanol, 1,2-dimethoxyethane, triacetin, glycerol tribenzoate, diethylphthalate, sucrose benzoate, diethylene glycol benzoate, dipropylene glycol benzoate, sulfonamides, n-ethyl toluene sulfonamide, sucrose acetate isobutyrate, and combinations thereof.

16. The wood filler composition of claim 11, wherein the plasticizer is present in an amount from 2 to 7.5 wt. % based on the total weight of the wood filler composition.

17. The wood filler composition of claim 11, wherein the at least one organic solvent is selected from the group consisting of acetone, n-butyl acetate, ethyl acetate, isopropanol, methyl ethyl ketone, cyclohexanone, ethanol, ethyl lactate, dimethyl carbonate, diacetone alcohol, and combinations thereof.

18. The wood filler composition of claim 11, further comprising an additive, wherein the additive is an adhesion promoter.

19. The wood filler composition of claim 11, further comprising an additive, wherein the additive is an amine-containing compound, an imine-containing compound, or an amide-containing compound.

20. The wood filler composition of claim 11, further comprising an additive, wherein the additive is selected from the group consisting of phenylurea, urea, 3-aminopropyltriethoxysilane, polyethyleneimine, imidazoles, pyridines, aryl sulfonamides, heterocyclic aromatic amines, imines, and amides, and combinations thereof.

* * * * *